July 2, 1935.  J. H. GWATHMEY  2,006,804
GAS BURNING APPARATUS FOR DOMESTIC HEATING PLANTS
Filed Jan. 19, 1934  2 Sheets-Sheet 1
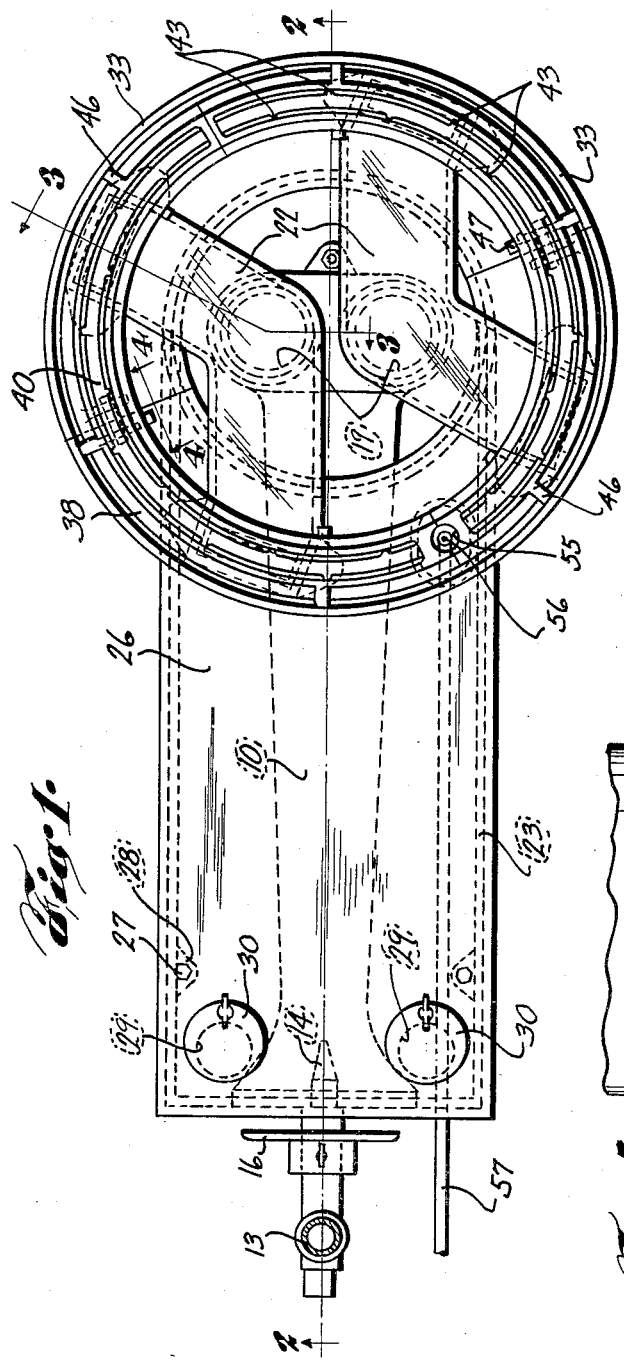
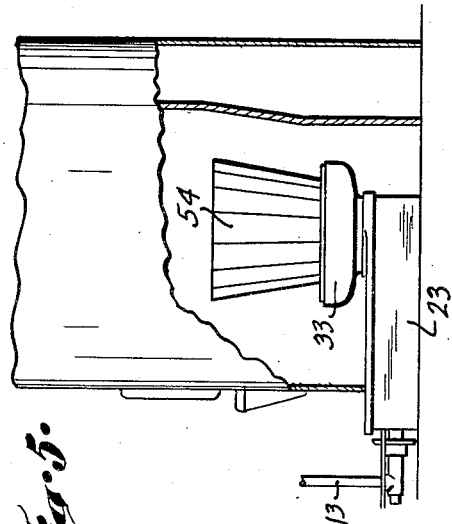
INVENTOR.
JOSEPH H. GWATHMEY
BY
ATTORNEY.

July 2, 1935.  J. H. GWATHMEY  2,006,804
GAS BURNING APPARATUS FOR DOMESTIC HEATING PLANTS
Filed Jan. 19, 1934  2 Sheets-Sheet 2
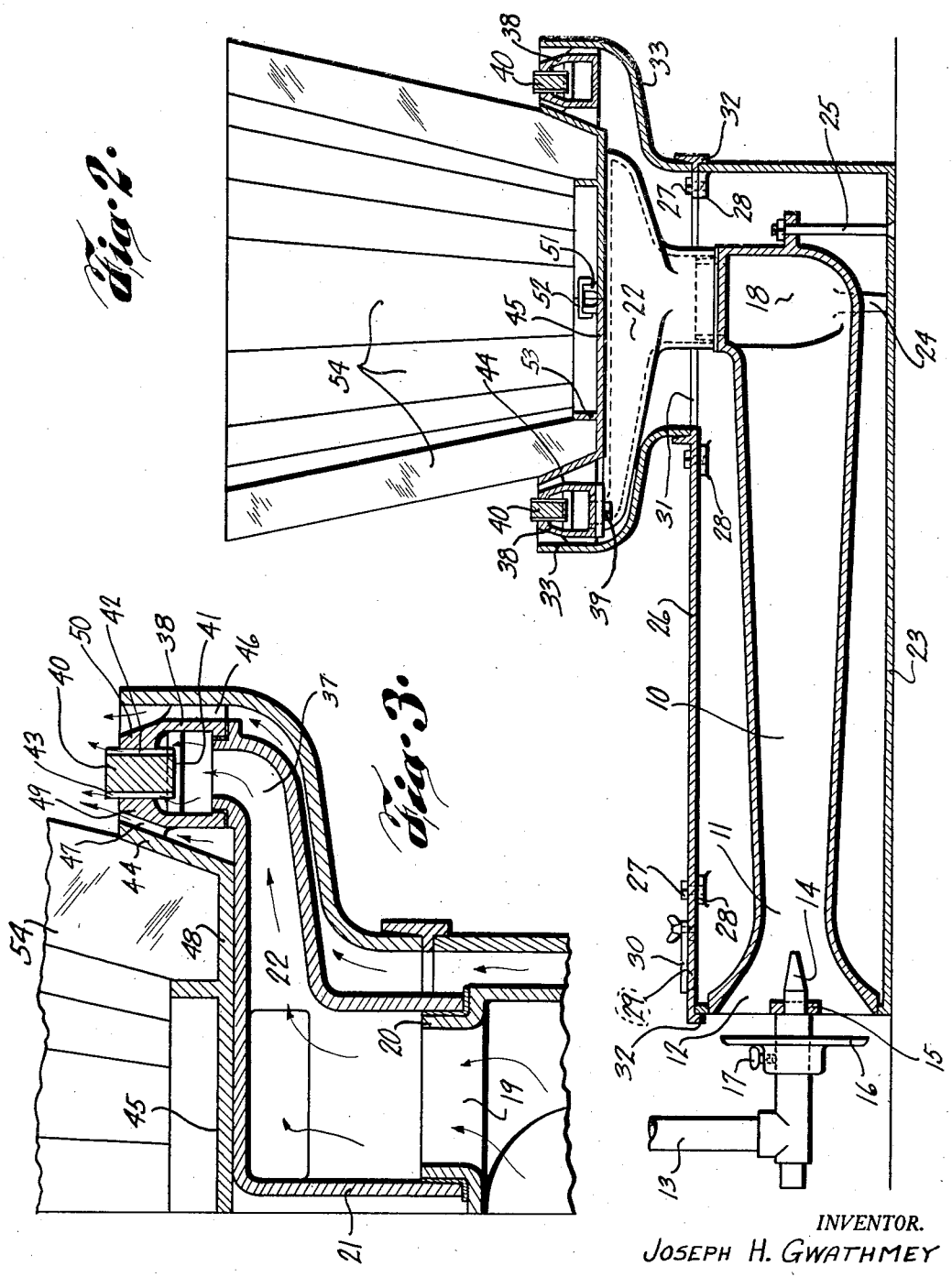
INVENTOR.
JOSEPH H. GWATHMEY
BY
ATTORNEY.

Patented July 2, 1935

2,006,804

UNITED STATES PATENT OFFICE 2,006,804

GAS BURNING APPARATUS FOR DOMESTIC HEATING PLANTS

Joseph H. Gwathmey, Harrisonville, Mo., assignor to Webb City Bank, Webb City, Mo., Citizens National Bank, Harrisonville, Mo., and Federal Reserve Bank of Kansas City, Kansas City, Mo.

Application January 19, 1934, Serial No. 707,277

2 Claims. (Cl. 158—104)

This invention relates to improvements in gas burning apparatus for domestic heating plants, and an object of the invention is to provide an improved gas burner which is relatively inexpensive of manufacture, highly economical and efficient in operation, and which is especially constructed to permit of its ready and simple installation in domestic furnaces originally designed for burning solid fuel.

In the drawings illustrating a presently preferred embodiment of the invention, Fig. 1 is a plan view of the device with a part of the burner head removed; Fig. 2 is a sectional side elevation taken at line 2—2 of Fig. 1; Fig. 3 is an enlarged sectional view taken at line 3—3 of Fig. 1; Fig. 4 is a sectional elevation showing preferred means for securing together certain of the burner parts, the illustrated portions being viewed as indicated by line 4—4 of Fig. 1, and Fig. 5 shows the device of my invention as installed in a furnace.

Referring now by characters of reference to the drawings, numeral 10 designates a horizontal pipe having a portion of reduced diameter forming a Venturi throat 11 located near its inlet end or mouth 12, the pipe 10 providing a mixing passage for fuel gas and primary air. Fuel gas from a supply conduit 13 is injected into the mixing tube 10 by means of a suitable nozzle 14, such nozzle being fixedly positioned by a bracket 15 which extends diametrally across the mouth of the tube. As a means for controlling the amount of primary air which is drawn into the tube 10, for purposes of regulating the air-gas ratio, there is provided an air control plate 16 carried by the nozzle 14 adapted for adjusting movement toward and from the mouth of the tube, a set screw 17 serving to secure the plate 16 in adjusted position.

The mixing tube 10 terminates at its discharge end in a chamber 18, located subjacent the burner head, to be hereinafter described, the upper wall of the chamber being provided with two laterally spaced discharge openings 19, each thereof surrounded by a vertically projecting annular flange or nipple 20. Communicating with each of the discharge openings 19 and forming a fluid-tight joint with the nipple 20 are pipe sections 21 which depend vertically from individual manifolds, or fuel distributing members 22.

The mixing tube 10 is enclosed by a box structure 23 which provides a passageway for conducting secondary air to the combustion zone. The mouth portion 12 of the mixing tube fits snugly within a central opening in the forward end wall of the enclosure 23, the mixing tube being supported at its discharge end by a vertical lug 24, a bolt 25 serving to secure the tube to the casing 23. The enclosure or casing 23 is provided with a removable cover plate 26, secured to the side walls of the enclosure by screws 27 which extend through apertures in the plate 26 and threadedly engage lugs 28 which project inwardly from the side walls of the enclosure. Secondary air is admitted into the enclosure through a pair of openings 29 disposed near the forward end of the cover plate. Adjustable closure elements 30 overlying the openings 29 serve as means for controlling and regulating the quantity of secondary air admitted into the enclosure, the secondary air being delivered to the burner head through a relatively large opening 31 in the cover plate. An annular upwardly projecting flange 32 which surrounds opening 31 engages the burner head and fixes the position of that member relative to the casing 23.

The burner head is comprised, in part, of a bowl-shaped casting 33 having an open bottom which communicates with the opening 31 in the cover plate. The head casting 33 is split diametrally which enables the head casting to be disposed in a furnace, the fire or ash door of which is too small to receive the casting in unitary form. A simple means for securing together the casting parts when inside the furnace is provided in the U-shaped clamps 34 which engage lugs 35 formed on the castings at points adjacent their mating surfaces. The lug engaging fingers 36 of clamps 34 are wedge-shaped and when driven over the lugs, cause the castings to be drawn and maintained tightly together.

Gas is conducted to a burner ring from the chamber 18 through the manifold castings 22, each thereof having hollow divergent arms 37 terminating in openings which communicate with openings in the bottom wall of the burner ring. The burner ring consists of a pair of hollow, semi-circular sections 38, each of which is secured to one of the manifolds 22 by means of bolts 39. The upper horizontal wall of each ring section 38 is slotted for the reception of a removable port-forming ring section 40. The ring sections 40 extend a substantial distance above the upper margins of the hollow ring castings 38 and are supported by means of spaced radial pins 41 which extend across the interior of the ring castings 38. Concentric gas discharge ports or slots 42 are formed between the side surfaces of the ring sections 40 and the inner wall surfaces of the hollow ring castings 38, and the concentric position of the ring sections 40 is maintained by a series of radially projecting lugs 43 thereon.

A number of advantages result from the foregoing construction. No drilling or other relatively expensive machining operation is required in forming the burner ports. The construction lends itself to the production of burner ports or slots of depth considerably greater than width which is conducive to the prevention of backfiring, a fault common to low pressure gas burners. In the present device the depth of the burner slots is substantially equal to eight times the width thereof. The upper portion of the port-forming ring 40 projecting above the upper surface of the burner ring 38 forms a barrier which prevents interference between the inner and outer flames. It has been found that interference between gas flames having a blue color when burning independently, results in a yellow flame of inferior heating quality.

As best appears from Fig. 2, the hollow ring castings 38 which form a passage for fuel gas, are concentrically positioned in an annular passage formed by the head casting 33 and the side wall, or flange 44 of a pan-shaped member 45. Through such passage flows secondary air which is divided by the ring castings 38 into two annular, concentric streams, one surrounding, and the other surrounded by the annular fuel gas streams issuing from the burner ring castings 38. The ring castings 38 are provided with a series of radially projecting spacer lugs 46. A second series of lugs 47 are provided for fixing the spacing of the ring castings 38 and the member 45. The flange 44 of member 45 slopes upwardly and outwardly from the bottom wall 48, and with the outwardly directed wall portions 49 of the ring castings 38 forms a divergent passage which is adapted to direct the secondary air discharged therefrom into the stream of fuel gas. Wall portions 50 of the ring castings 38 slope inwardly which permits a portion of the outer stream of secondary air to be discharged into the stream of fuel gas. In this manner the secondary air is thoroughly intermixed with the fuel gas at the zone of combustion, resulting in a high temperature, extremely efficient flame.

The member 45, like the head casting 33, and ring castings 38 and 40, is preferably split diametrally to facilitate its installation in a furnace, and like head casting 33 is adapted to be integrated in the interior of the furnace, lugs 51 and one or more U-clamps 52 (Fig. 2), serving to secure the parts together. The member 45 is provided with an annular upstanding flange 53 which, with flange 44, serves to position a series of ceramic baffle elements or radiants 54. The radiants 54 project divergingly upward from the outer margin of member 45 for impingement by the flame, their purpose being well known in the art.

The burner ring sections 38 are provided with complementary recesses 55 adjacent their mating edges, forming an opening through which extends a vertical nozzle 56 for a pilot light, the gas for the pilot light being supplied through a conduit 57.

From the foregoing description it will appear that the burner of my invention is economical of manufacture and installation. Practically no machining of the cast parts is required which materially reduces the cost of manufacture. The gas and air discharge ports are formed by spaces between separable castings, hence the relatively expensive drilling operation for producing burner ports is avoided. The facility of installaton is enhanced by the simple means provided for assembling the parts inside the furnace, the use of nuts and bolts for this object being purposely avoided.

Having described my invention with reference to a single presently preferred embodiment thereof, it will appear that certain changes may be made in the construction herein illustrated without departing from the spirit and full intended scope of the invention.

I claim:

1. A gas burner comprising an elongate casing, a mixing tube spaced within the casing, a pair of manifold members communicating individually with the mixing tube, each thereof having hollow, relatively divergent arms, a hollow, semi-circular burner member secured to each manifold, said burner members having openings in the upper sides thereof, semi-circular elements projecting into said openings, said elements projecting above the upper surfaces of the burner members and being spaced from the margins of said openings to form concentric burner slots, a burner head casing surrounding the burner members and spaced therefrom, a cover plate having an upwardly and outwardly projecting peripheral flange spaced from the inner wall portions of the burner members and an upwardly projecting flange spaced from said peripheral flange and baffle elements projecting upwardly from said cover plate, having their lower ends positioned between said flanges.

2. In the combination specified in claim 1, the burner head casing and cover plate being formed in semi-circular sections, and means for securing together the sections, said means comprising paired lugs adjacent the mating surfaces of said sections, and U-shaped elements in clamping engagement with said lugs.

JOSEPH H. GWATHMEY.